United States Patent [19]

Schimmerling

[11] 3,895,717

[45] July 22, 1975

[54] DEVICE FOR PROGRAMMING AND SELECTING DOCUMENTS

[76] Inventor: Michel Gerard Schimmerling, 30, rue de la Liberte, 67380 Lingolsheim, France

[22] Filed: June 11, 1974

[21] Appl. No.: 478,349

[30] Foreign Application Priority Data

June 15, 1973 France ............................ 73.22591

[52] U.S. Cl. ................................................ 209/80.5
[51] Int. Cl.² ..................................................... B07C
[58] Field of Search ........................ 209/80.5, 110.5

[56] References Cited

UNITED STATES PATENTS

| | | | |
|---|---|---|---|
| 3,524,545 | 8/1970 | Doundoulakis et al. | 209/80.5 |
| 3,670,885 | 11/1970 | Harlow | 209/80.5 |
| 3,785,486 | 1/1974 | Yanagawa | 209/80.5 |
| 3,841,480 | 10/1974 | Yanagawa | 209/80.5 |

*Primary Examiner*—Allen N. Knowles

[57] ABSTRACT

Device for programming and selecting documents from data registered as a binary information by means of tabs which are present or not under feeler means. The feelers are mounted on a carriage which moves above the documents. Means are provided for actuating or not the feelers in view to the desired programming or selecting by simply displaying the desired program on the carriage.

7 Claims, 13 Drawing Figures

PATENTED JUL 22 1975 SHEET 2 3,895,717

DEVICE FOR PROGRAMMING AND SELECTING DOCUMENTS

The present invention has essentially for its object a device for programming and selecting documents, one edge of which is provided with program and selection tabs.

Devices of this kind are known, wherein the documents can be arranged pell-mell in a filing cabinet, the device also comprising a selection carriage which can be displaced above the documents in order to perform the selection by raising at least one side of the documents selected in accordance with data recorded in the form of the said tabs which are either present or absent, corresponding to a binary information 0,1. The carriage is provided with a set of feelers such as rollers, each of which rolls opposite the location of one of the tabs of the document, the selection being performed by previously raising the documents and then lowering the discrepent documents every time the carriage passing above them repulse by at least one of its rollers a selection tab present opposite the document.

A device of this type has been described notably in a prior patent application filed in the name of same Applicant on May 9, 1973 under Ser. No. 358,539, now U.S. Pat. No. 3,809,237.

Such devices are entirely satisfactory as regards the reliability and rapidity of selection of the documents. However, a drawback to such devices is that the programming proper of the documents is relatively slow and may be difficult to achieve for an unspecialized staff. Likewise, the reading programming of the carriage on which must be mounted the sets of rollers corresponding to the desired selection is an operation which, although not actually long, is not immediate and requires a great number of sets of rollers corresponding to the different desired selection programs.

The abovementioned drawbacks of the known device are avoided when, according to the invention, the aforesaid feelers are mounted juxtaposed on the carriage and each opposite a location of an information tab of the document, and when means are provided to maintain, according to the desired programming or selection, some of the said feelers in the lower position wherein they meet, during the translatory motion of the carriage above the documents, the tabs which are present opposite them, or pass freely above the document in the interval left free by the absence of a tab, the said means also enabling other feelers to be maintained in an upper position wherein they freely pass above the documents during the translatory motion of the carriage, irrespective of whether tabs are present opposite them.

According to another feature of the device of the invention, each feeler is mounted on a fork mounted on a pivot pin, which fork comprises a tooth which presses against the edge of a programming disk provided with slots adapted to receive the said tooth for certain angular orientations of the programming disk, and the said feelers are in the said upper position or lower position according to whether the tooth of the corresponding fork is or is not engaged in a said slot of the programming disk. By providing a simple device for displaying the selected program, it is then easy, without having to replace any of the feelers mounted on the carriage, to display any desired selection program.

According to another important feature of the invention, in order to perform the programming of documents according to the selected information, a frame is provided to receive the said carriage, a support for gripping the documents to be programmed, the said support comprising means for gripping substantially horizontally the document at its edge provided with information tabs, the said tabs being sandwiched at their lower portions between a side-clamp and the support and projecting above the said support, a disk mounted rotatably substantially about a vertical axis contained in the medial plane of the document, below the carriage feelers and above the document information tabs, cutters or punches being mounted on the disk in radially shifted arrangement so that each cutter is located on the same radius as a feeler and as an information tab, and also in angularly shifted arrangement, the said cutters or punches passing through holes provided in the disk and being lowered against the action of resilient return means when passing under a feeler positioned in lower position, thus projecting under the disk down to the height of the corresponding radial tab of the document, the said carriage having the lower ends of its feelers arranged in a vertical plane parallel with and distinct from the vertical plane passing through the middle of the said information tabs. Thus, in order to perform the programming of a document according to an information program displayed on the carriage, it is sufficient to rotate the disk, the carriage feelers in lower position thus successively lowering the opposite cutters carried by the disk, which cutters, a moment later, will cut the information tabs to be notched by breaking them one by one, thus transposing the binary information displayed on the carriage to a corresponding binary information displayed on the document. Since it is the same carriage, or at least a similar carriage, that will serve to carry the information onto the document or to read the information carried by the latter, no error is liable to occur. Moreover, the notching of the document is of course quite simple and also very quickly performed.

The invention will appear more clearly from the following description made with reference to the appended drawings illustrating, only by way of example, one method of reducing the invention to practice. In the said drawings.

Figures 1, 10, 11, 13:
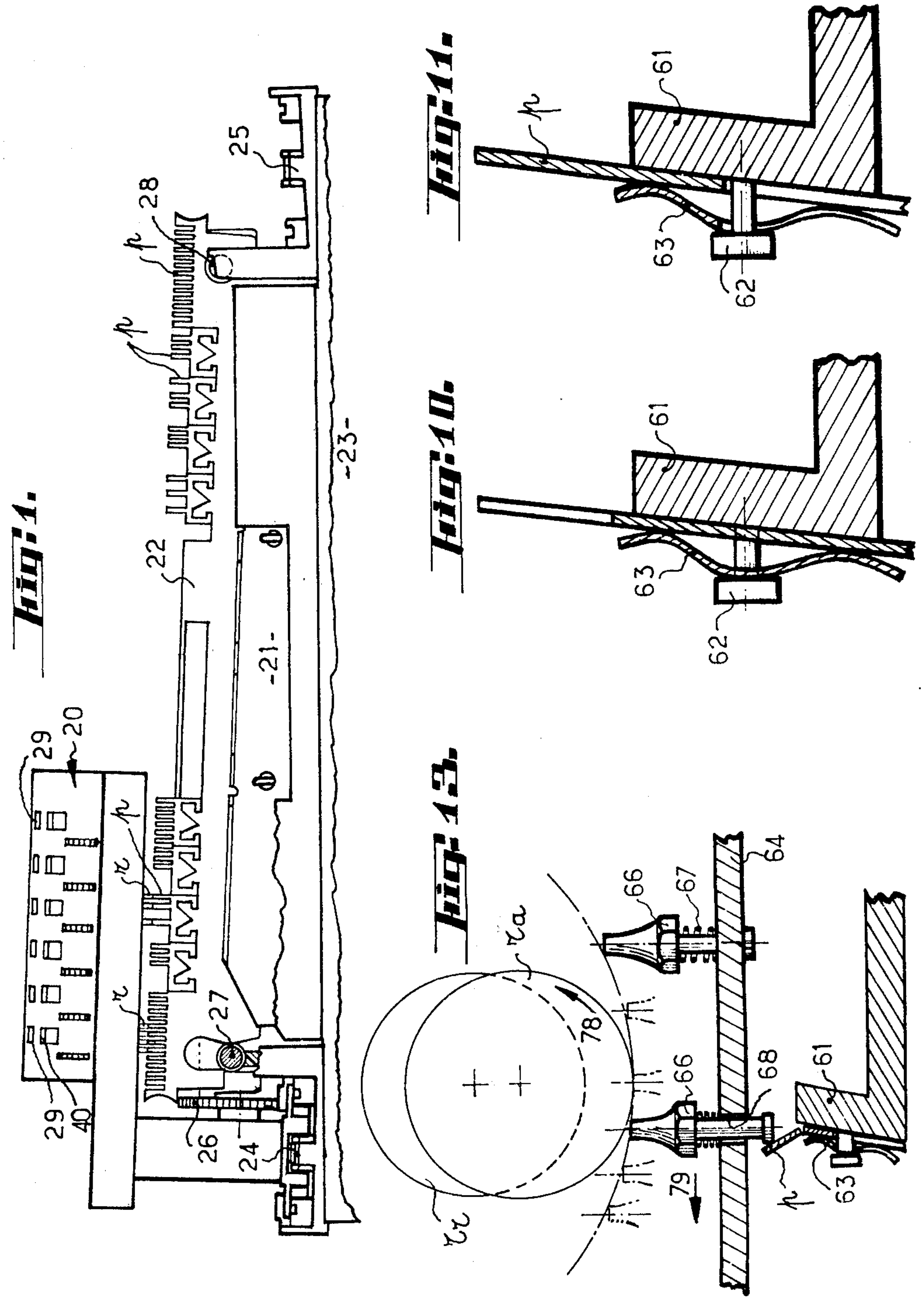
FIG. 1 is a front, partially broken-away view of a device with a carriage used according to the invention for "reading" previously programmed documents.
Figure 9:
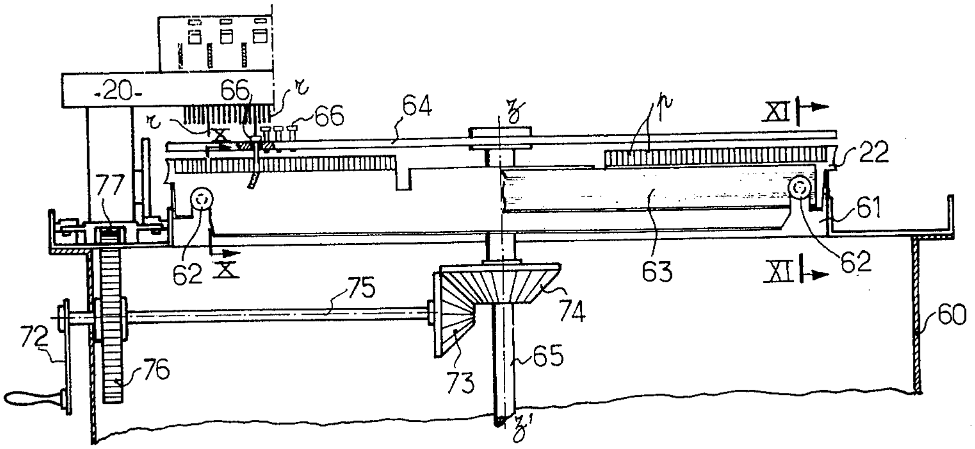
Figure 12:
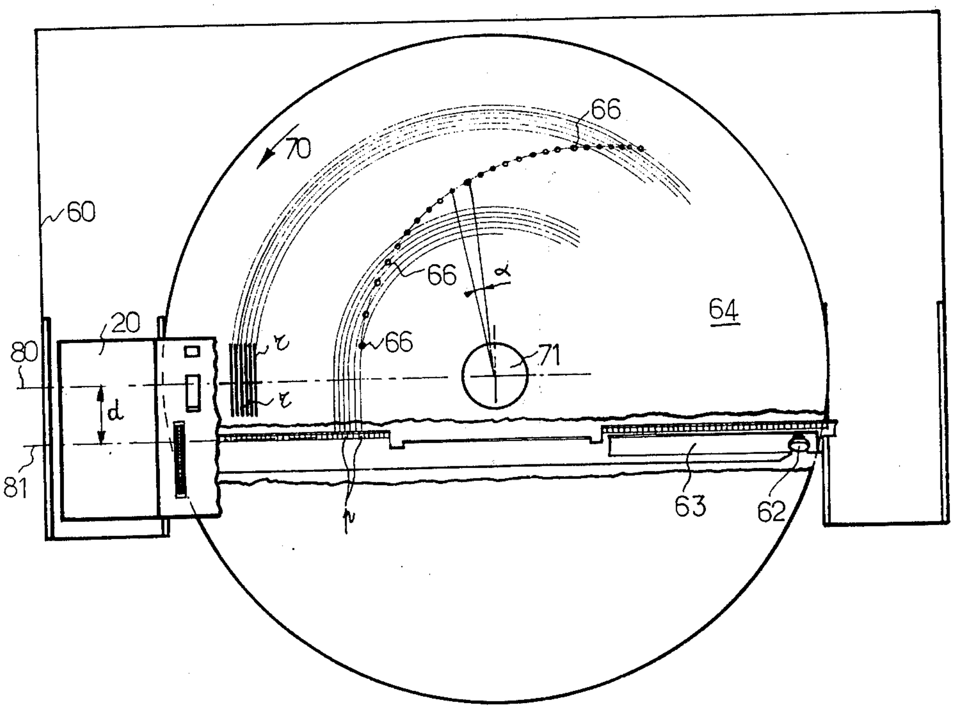

FIG. 9, like FIG. 1, shows a carriage associated with a support frame of a disk for binary programming of a document;

FIGS. 10 and 11 are cross-sectional views to a larger scale and with broken-away portions at the level of planes X—X and XI—XI of FIG. 9, respectively, and showing the gripping of a document on the frame;

FIG. 12 is a top view of the device illustrated in FIG. 9;

FIG. 13 is a detailed view, to a larger scale of a portion of the notching mechanism associated with the device.

Reference is first made to FIG. 1, in which there is shown at 20 a carriage for programming and selection of documents in the form of, for example, index cards 21 suspended from a support strip 22 provided with programming and selection tabs *p*, as described for instance in the above-mentioned patent application. As known per se, the tabs *p* serve to record on the document a binary code information, 0 corresponding to the absence of a tab and 1 to the presence of a tab. Such documents may be provided with a great number of selection tabs, for instance about fifty or a hundred, and therefore allow for a complete and highly diversified programming owing to the considerable number of combinations of possible arrangements.

As described in the above-mentioned patent application, the selection of documents is performed by means of a simple to and fro movement of the carriage over a chest 23 in which it rolls for example on a toothed rack 24 at the left or 25 at the right. During its "forward" movement the carriage raises by its wheel 26 the various documents which are then maintained skew on the rods 27, 28, by being raised on the rod 27 as illustrated. During the "return" movement of the carriage, the feelers with which it is provided and which are constituted by rollers *r* repulse the documents and lower them horizontally every time a roller *r* moves opposite a selection tab which has not been broken. Therefore, at the end of the forward and return movement, there remain in the filing cabinet lowered documents which have not been selected and raised documents which have been selected according to the information provided on the carriage 20, the selected documents corresponding to all the documents having no tabs opposite any one of the selecting rollers *r*.

Figure 2:
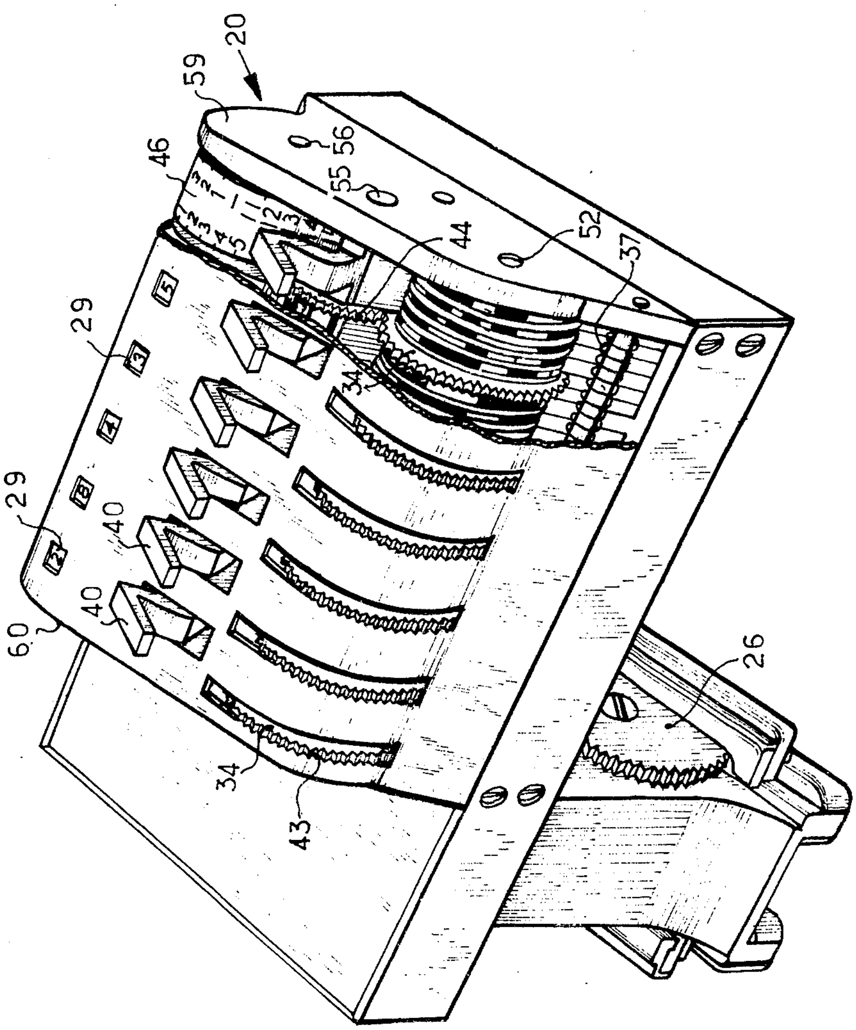
FIG. 2 is a perspective view of a carriage allowing an information to be read and recorded on a document provided with information tabs.

According to the invention, and as seen more clearly in FIG. 2, it is possible, by simply displaying a datum such as a digit in a reading aperture 29, to choose any one of the various information programs which it is desired to obtain, each program corresponding to a single predetermined arrangement or rollers *r* which are present, i.e. sufficiently lowered to repel the opposite selection tabs *p*.

Reference is now made to FIGS. 2 to 8 illustrating the mechanism for programming the carriage 20.

Figure 3:
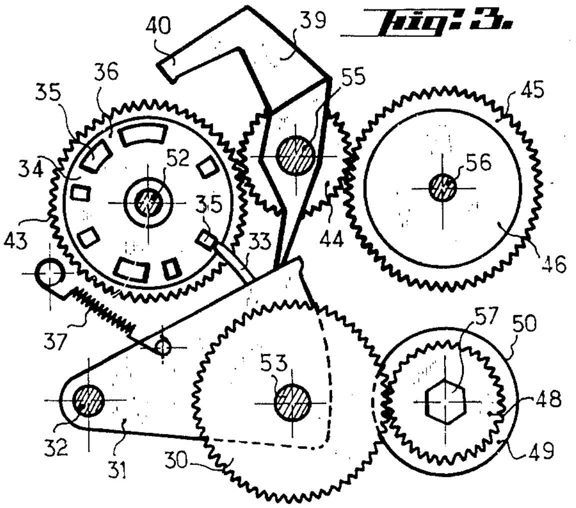
FIGS. 3, 4 and 5 show three respective positions of some of the important mechanisms provided on the carriage for various operating stages.
Figure 4:
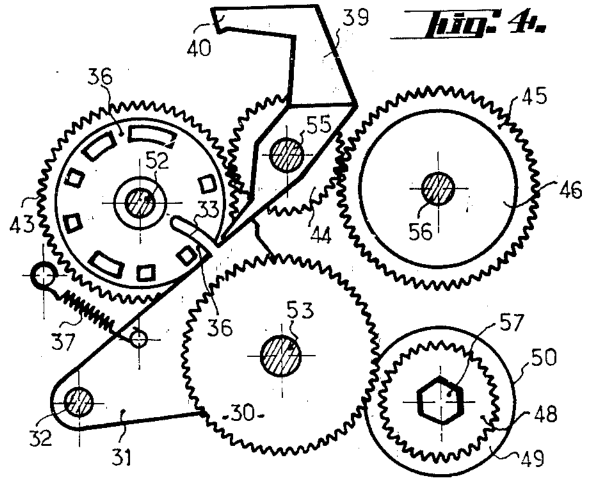
Figure 5:
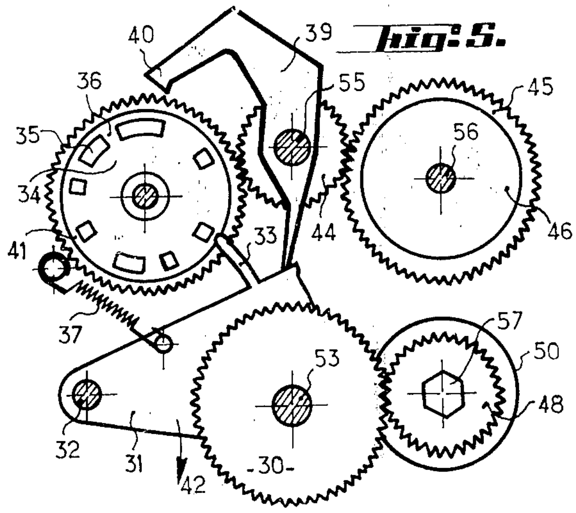

Reference is first made more precisely to FIGS. 3 to 5 which show the mechanism allowing a carriage feeler to be maintained in a lower position or a higher position and also to pass from one position to the other or vice versa, the said feelers being constituted, in the example contemplated, by selection disks.

Each selection disk 30 is mounted on a fork 31 mounted pivotally about a pin 32. Each fork 31 comprises a tooth 33 bearing upon the edge of a programming disk 34 provided with bosses 35 and slots 36 adapted to receive the tooth 33 of the fork depending upon the angular orientation of the programming disk 34. As appears from FIG. 3, when the tooth 33 is opposite a boss 35, the selection disk 30 is in a "lower" position on the carriage. When, as illustrated in FIG. 4, the tooth 33 is in a slot 36, the selection disk 30 is in an "upper" position on the carriage. The return spring 37 ensures the upward return motion of the disk 30.

In order to pass from one position to the other, the mechanism comprises a disengagement lever 39 which, when the finger-key 40 is pressed, allows the fork to be lowered and to pass to the disengaged position illustrated in FIG. 5 in which the fork tooth 33 passes above the bosses 35 of the programming disk 34. It will be noted, however, that the tooth 33 remains constantly guided on an external guiding collar 41 of the programming disk 34.

As appears more clearly from FIG. 5, when the finger-key 40 of the disengaging lever 39 is pressed, the fork 31 rotates about its pivot pin 32 in the direction of arrow 42, thus lowering the selection disks 30, and the tooth 33 is disengaged from the bosses 35 and slots 36 of the programming disk 34. Under such conditions, it is possible to rotate the disk 34, for example by acting with the hand on the knurled portion 43 of the said disk, so as to place it in the desired programming position. Simultaneously, the teeth 43 of disk 34 mesh with the pinions 44 and 45 constantly meshing with the disk 34. The pinion 45 rotates jointly with a display drum 46 carrying indications such as digits which are displayed in the apertures 29 of the carriage.

Furthermore, there is seen in FIGS. 3 to 5 a disk 48 meshing with a selection disk 30 in the lowered position of the latter as shown in FIG. 3 and which does not mesh therewith in the raised position shown in FIG. 4. During the forward and return motions of the carriage, the disk 48 is driven in rotation as well as the document raising wheel 26 by a gear-wheel mechanism such as described in the above-mentioned patent application and comprising notably a pinion (not shown) rolling on the toothed rack 24 of the filling cabinet 23. Under such conditions, during the selection of documents, the selection disk rotates at a suitable speed preventing the documents from being expelled, as described in the said patent application, the selection disks engaging the projecting tabs of the documents by rolling thereon without there occurring any notable relative advancing speed between the document and the disk periphery.

In FIGS. 3 to 5, there is also seen the guiding collar 49 of a disk 50 associated with the driving disk 48.

Figure 6:
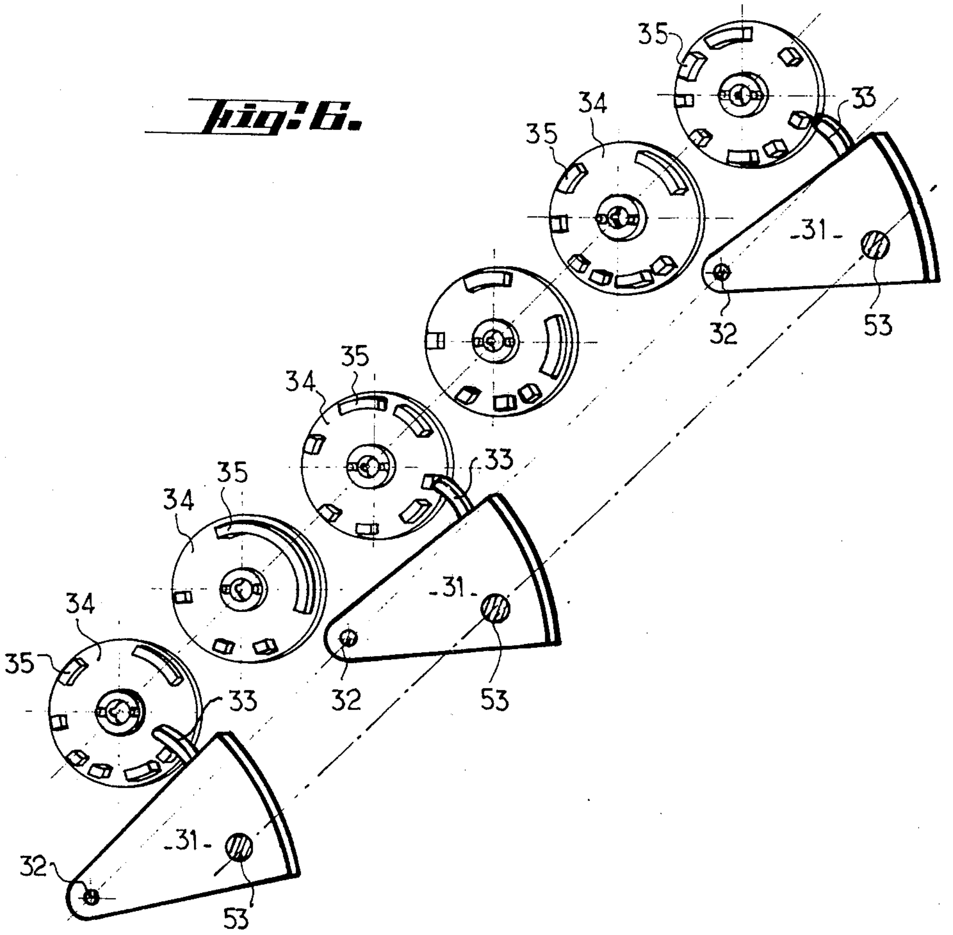
FIG. 6 is a perspective exploded view of a certain number of programming disks and associated forks.
Figure 7:
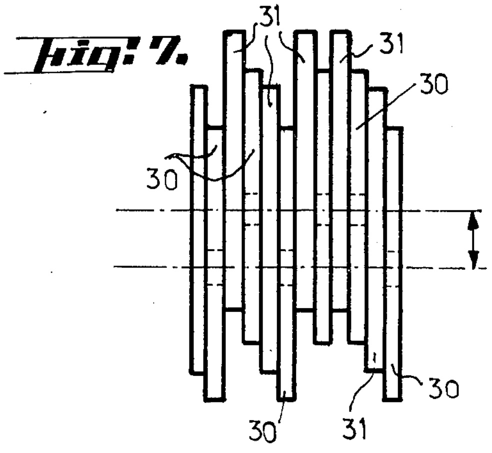
FIGS. 7 and 8 are diagrammatic end-views, in an operating position and in a disengaged position, respectively, of a set of six programming disks and six associated forks.
Figure 8:
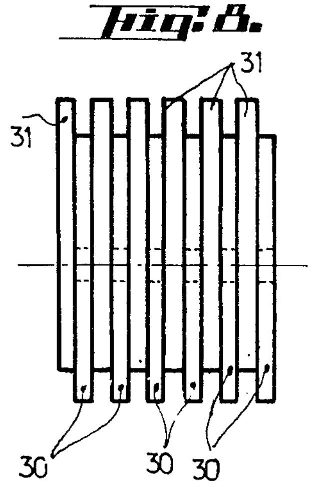

In practice, and as appears notably from FIGS. 6 to 8, various elements such as described above in relation with FIGS. 3 to 5 are stacked.

Thus, various programming disks 34 are stacked on one and the same axis on a pivot rod 52. These various disks are advantageously constituted by a moulded plastics material and may be associated for instance in a group of six to form a programming drum to which will correspond every time a knurled element 43, a disengaging finger-key 40, a displaying drum and a display aperture 29. Of course, a similar number of forks 31 is stacked on a common pivot 32. To each fork 32 corresponds a selection disk 30, the pivot 53 of which may be cast integral with the fork. The lever 39 will engage the six adjacent forks of one and the same drum to ensure the desired selection in the upper position or the lower position of the six corresponding selection disks.

As regards the disks 44 and 45, a single disk is of course sufficient for each programming drum. On the contrary, several display drums and several pinions 44 will be stacked on pivot bars 55, 56, it being understood that there are as many of them as there are programming drums and therefore disengaging fingerkeys 40 and display apertures 29.

As regards the driving disks 48, there are as many of them as there are selection disks so as to ensure at the same time a reliable lateral guiding of the selection disk between the guiding collar 49 of a drum 50 and the opposite face of the adjacent drum. The polygonal axis pin 57 on which are mounted the driving drums ensures the rotation of the driving disks at the desired speed, said axis pin being itself driven by a set of intermediate pinions (not shown) connected, like the wheel 26, with the translatory movement of the carriage.

The various members are readily mounted in the carriage by simply stacking recurrent elements about pivots constituted by rods mounted on the side walls 59, 60 of the carriage.

In FIG. 7 is seen a stack of six forks 31 carrying six selection disks 30, three of which are in lower position and three in upper position. In FIG. 8 is seen the position of the said forks and disks when the disengaging finger-key 40 is fully depressed.

Reference is now made to the description of FIGS. 9 to 13 illustrating the use of the carriage to perform the programming of documents through suitable notching of the information tabs.

In order to perform the programming and as appears more clearly from FIG. 9, the carriage 20 is positioned on a frame 60 provided with a support 61 for gripping documents 22 to be programmed. The said document initially has all its tabs *p* projecting on the upper edge of the document. The document is engaged substantially horizontally on two pivots 62, the tabs *p* being sandwiched at their lower portions between the support 61 and a resilient, for instance metallic strip 63 forming a side-clamp adapted to be resiliently applied on the pivots 62 as illustrated in FIGS. 10 and 11. The tabs *p* thus project above the side-clamp 63.

A disk 64 is mounted rotatably substantially about the vertical axis *z'z* contained in the medial plane of the document. A central pivot 65 extending along the axis *z'z* allows the rotation of the disk 64. As appears from FIG. 9, the disk 64 rotates right above the tabs *p* of document 22 and right below the selection rollers *r* of the carriage 20.

Cutters or punchers 66 are mounted on the disk in radially shifted arrangement so that each cutter is located on the same radius as a roller *r* and an information tab *p* (FIG. 12), and shifted also angularly by a centre angle $\alpha$, the said cutters passing through holes 68 (FIG. 13) provided in the disk 64. Each cutter 66 is returned by a return spring 67 (FIG. 13) to its upper position in which it slightly projects under the disk 64. The dimensions are so selected that when a roller *r* of the carriage 20 is lowered, and when the disk 64 is rotated in the direction shown by the arrow 70 in FIG. 12, the cutter 66 arranged radially at the same distance from the centre 71 as this roller will be lowered against the action of the return spring 67 as illustrated in FIG. 13 by the said lowered roller ($r_a$ in FIG. 13). On the contrary, the cutters which will be arranged at the same radial distance from the centre 71 of a raised roller ($r_r$ in FIG. 13) will not be lowered by the said rollers when they pass under them. Likewise, and as appears from FIG. 13, if a cutter 66 has been lowered by a roller $r_a$, a very short instant later and before it is returned by the spring 67 it will hit the tab *p* of the document to be notched, which tab is located at the same radial distance as the roller $r_a$ and the corresponding cutter 66 which has been lowered.

The disk 64 may be rotated by means of a crank 72 and bevel pinions 73, 74, the latter being mounted on the pivot 65. Under such conditions, it will be advantageous to provide on the shaft 75 of the crank a pinion 76 meshing with the pinion of the carriage 77 which rolls normally on the toothed rack 24, 25 (FIG. 1). In this manner, by means of the mechanism described previously, the lowered selection rollers $r_a$ will be driven in rotation, as indicated by arrow 78 (FIG. 13). Thus, the action of the cutters 66 during the rotation of the disk moving in the direction of arrow 79 will take place in excellent conditions, the roller rolling at a speed substantially equal to the peripheral rotary speed of the said cutter.

It is understood that with such a mechanism a document will be readily notched by breaking successively one after the other the various tabs which it is desired to notch on the document at the level of the selection rollers $r_a$ which have been lowered on the carriage. This operation will be all the more easy to perform as the tabs *p* are normally constituted by a readily breakable plastics material.

With such a selection mechanism, it is obvious that no programming error is possible since a same carriage is used to record the information on the document and to read it.

In FIG. 12 is to be noted the shifting *d* of the two vertical planes 80, 81 containing the lower ends of the rollers *r* and the middle portions of the tabs *p*.

What is claimed is:

1. In a device for programming and selecting documents having an edge provided with programming and selection tabs, the said documents being adapted to be arranged pell-mell in a filing cabinet, the said device also comprising a selection carriage adapted to be dispaced above the documents in order to select the same by raising at least one side of the selected documents in accordance with data registered in the form of the said tabs which are either absent or present, corresponding to binary information 0, 1, the said carriage being provided with a set of feelers, each travelling opposite the location of one of the said document tabs, the selection being performed by first raising the documents and then lowering the discrepant documents each time the carriage passes above the documents and repels, by at least one of its feelers, an opposite present selection tab of the document, the improvements consisting in that the feelers are mounted juxtaposed on the carriage, each opposite the location of an information tab, and means are provided to maintain according to the desired programming and selection (a) some of said feelers in a lower position in which they either meet, during translatory motion of the carriage above the documents, opposite present tabs or freely pass above the document in the space left free by the absence of a tab and (b) to maintain other feelers in an upper position in which they freely pass during the translatory motion of the carriage above the documents, irrespective of the presence or absence of opposite tabs, each said feeler being mounted on a fork in turn mounted on a pivot pin, said fork having a tooth, a programming disk, having an edge upon which said tooth bears and being formed with slots adapted to receive said tooth for predetermined angular orientations of the said programming disk, said upper and lower positions of the feelers being determined by whether the tooth of the corresponding fork is engaged in a slot of the programming disk, a disengaging lever, and a locking and resilient-return mechanism which acts upon said lever to allow a tooth of the fork to be disengaged from the slot of the programming disk and being effective to rotate said disk to another relative angular position and thereby also the tooth of the fork.

2. Device according to claim 1, comprising a disk for displaying the position of the programming disk, the said disks driving one another.

3. Device according to claim 1, wherein each feeler is constituted by a selection disk, each selection disk being rotatably mounted about a pivot carried by its corresponding fork and meshes, for rotation thereof during the translatory movement of the carriage, with a driving disk which is itself driven by a bevel-gear transmission and a pinion moving jointly with the carriage and rolling on a guiding lateral toothed rack of the filing cabinet.

4. Device according to claim 3, wherein the carriage comprises successive stacks of said forks, programming disks, selection disks and driving disks, along substantially horizontal axes perpendicular to the direction of displacement of the carriage above the documents, the successive stacks of programming disks forming programming drums.

5. Device according to claim 4, wherein each lever under action of said locking and resilient return-mechanism disengages several juxtaposed forks.

6. Device according to claim 3, wherein in order to perform the programming of the documents according to the selected information, there is provided a frame which receives the said carriage, a support for gripping the documents to be programmed, the said support being provided with means allowing the document to be substantially horizontally gripped by its edge provided with the information tabs, the said tabs being sandwiched at their lower portion between the said support and a side-clamp and projecting above the said support, a disk mounted rotatably substantially about a vertical axis contained in the medial plane of the document, below the selection disks of the carriage and above the information tabs of the documents, cutters being mounted on the disk in radially shifted arrangement so that each cutter is located on the same radius as a selection disk and an information tab, and also in angularly shifted arrangement, the said cutters passing through holes provided in the disk and being lowered against the action of resilient return means when passing under a selection disk positioned in lower position and projecting under the disk down to the height of the corresponding radial tab of the document, the said carriage having the lower ends of its feelers arranged in a vertical plane parallel with but distinct from the vertical plane passing through the middle of the said information tabs.

7. Device according to claim 6, comprising means for driving in rotation the disk and associated means for driving in rotation a pinion meshing with the said pinion of the carriage which itself meshes with the driving disks of the selection disks.

* * * * *